Figure 1:
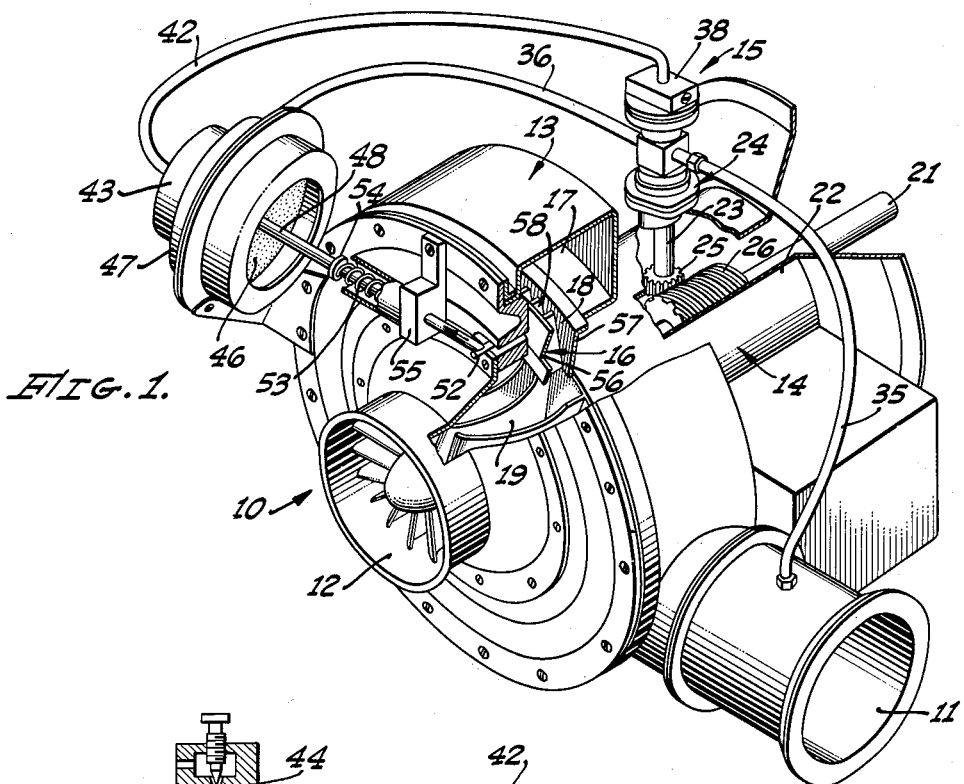

Jan. 17, 1956  R. A. FISCHER ET AL  2,731,022
SPEED REGULATING MECHANISM
Filed May 10, 1950

RICHARD A. FISCHER,
ROBERT A. ARTHUR,
JAMES M. KEMPER,
INVENTORS.

BY John H. Wallace

# United States Patent Office 2,731,022
Patented Jan. 17, 1956

2,731,022

SPEED REGULATING MECHANISM

Richard A. Fischer and Robert A. Arthur, Los Angeles, and James M. Kemper, Hollywood, Calif., assignors to The Garrett Corporation, Los Angeles, Calif., a corporation of California Application May 10, 1950, Serial No. 161,226

2 Claims. (Cl. 137—34)

The invention relates to speed regulating mechanisms for prime movers and more particularly relates to pneumatic speed regulating mechanisms for fluid turbines. The invention will be herein disclosed as embodied in an air turbine speed regulating mechanism having a novel pneumatic reset and damping system.

In the present state of the art of controlling the speed of prime movers, it is possible to obtain satisfactory practical solutions in most cases, unless the sensitivity of the controlling mechanism is increased too greatly. If a wide range and therefore a relatively wide departure from the desired speed can be tolerated, present controls are found to be adequate and have been so for a long time. However, when for some purpose it is desired to control the speed of prime movers at a constant speed within close limits, rapid response or highly sensitive control must be attempted and in this case serious difficulties with regard to the stability of the control have been encountered.

With respect to these difficulties, it is well known that when the sensitivity of a control mechanism is increased a condition of instability arises due to the tendency of the controls to hunt freely or to oscillate with a large amplitude. It is also known that in order to reduce this instability and to provide a fast acting yet stable control, antihunting or damping means must be provided. The result is, therefore, that in order to provide great sensivity and at the same time include the necessary corrective dampening devices, constant speed control mechanisms must be rather complicated devices.

Furthermore, such rather complicated devices are usually designed for a particular purpose and are not very easily adaptable to varying requirements of different installations, and it is therefore nearly always necessary to solve each control problem anew. This is not a simple matter since the design of a sensitive control mechanism usually requires ingenuity of a high order as well as an ability to solve difficult theoretical problems. The need is great, therefore, for a sensitive speed control mechanism which is rapid acting, stable, accurate, and at the same time flexible in its application and adaptable to a variety of different installations.

It is accordingly an object of the invention to provide a highly sensitive yet stable speed regulating mechanism for prime movers.

It is a further object of the invention to provide a highly sensitive yet stable speed regulating mechanism for fluid driven prime movers.

It is a further object of the invention to provide a highly sensitive yet stable speed regulating mechanism for pneumatically controlling the speed of prime movers.

It is a further object to provide a highly sensitive yet stable speed regulating mechanism for pneumatically controlling the speed of fluid driven prime movers.

It is a particular object to provide a speed regulating mechanism for fluid motors.

It is another particular object to provide a pneumatic speed regulating mechanism for fluid turbines which will regulate their speed in an accurate and stable manner over a large range of speeds and under greatly different conditions of load.

It is a further object to provide an improved system for resetting and damping highly sensitive speed regulating mechanisms.

It is a further particular object to provide a pneumatic reset and damping device for stabilizing the pneumatic control of fluid turbine governors.

It is a still further object of the invention to provide an improved speed regulating mechanism which is simple to construct, efficient, accurate and stable in its response, flexible in its application, adaptable to varying requirements of different installations and which is superior in these and other respects to speed governing mechanisms heretofore known.

Figure 2:
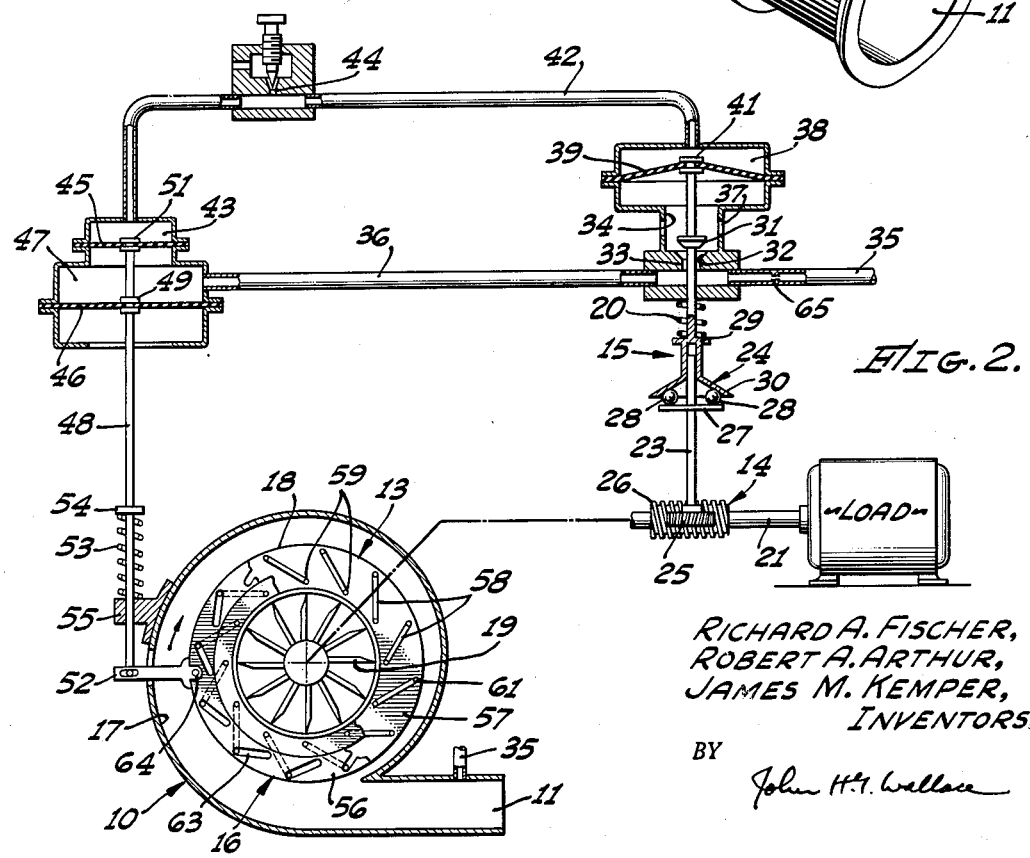

These and other objects are effected by our invention, as will be apparent from the following description and claims taken in connection with the accompanying drawings forming a part of the specification and in which:

Figure 1 is a perspective view, partly broken away of an air turbine motor including a pneumatic speed controlling mechanism embodying the invention; and Figure 2 is a schematic diagram illustrating the operation of the invention.

Referring now to the drawings and particularly to Figure 1, there is shown an air turbine motor 10 having a compressed air inlet 11 and an air outlet 12 and including a turbine assembly 13, a gearing assembly 14, a governor assembly 15, and a turbine nozzle and nozzle actuating assembly 16.

The compressed air inlet 11 opens into a turbine scroll or nozzle box 17 which is located circumferentially about an annular variable area turbine nozzle 18 encircling a turbine wheel 19. The turbine wheel 19 is mounted on a rotatable turbine shaft 21 which extends through a turbine gear box 22. A driving shaft 23 of a centrifugal governor 24 extends into the turbine gear box 22, and a governor gear 25 mounted on the end of the governor driving shaft 23 meshes with a governor driving gear 26 which is also mounted on the turbine shaft 21.

The governor assembly 15 comprises the centrifugal governor 24 which includes a downwardly extending driving shaft 23 provided with a ball retainer plate 27 integral with the shaft 23, a plurality of fly-balls 28 and an upwardly extending valve rod 29. The lower end of the valve rod 29 is enlarged and has an axial bore to receive the upper end of the driving shaft 23 and is also flared to form a conoidal cup 30, within which the fly-balls 28 are held by means of the retainer plate 27. The upwardly extending valve rod 29 is provided with a pilot valve including a valve body 31 which fits a valve seat 32 for closing a valve passageway 33 between an exhaust chamber 34 and air conduits 35 and 36. The valve rod 29 is surrounded by a coiled compression spring 20 tending to move the valve body 31 toward its seat 32, and thus provide a restoring force opposing the centrifugal action of the governor 24.

The exhaust chamber 34 has an exhaust port 37 and is sealed off from a governor reset chamber 38 by means of a governor reset diaphragm 39 which is connected at point 41 to the upper end of the valve rod 29.

The governor reset chamber 38 is connected through a pressure transfer conduit 42 to a sensing diaphragm chamber 43, and the pressure transfer conduit 42 is provided with an adjustable leak orifice 44.

As clearly shown in Fig. 2 an actuator movement sensing diaphragm 45, separates the sensing diaphragm chamber 43 and an actuator chamber 47. The actuator chamber 47 is formed and enclosed by means of the actuator movement sensing diaphragm 45 and an actuator diaphragm 46, and is provided with an entering air pressure conduit 36.

An actuator rod 48 is attached at 49 along its length to the actuator diaphragm 46, and at 51 at one of its ends to the actuator movement sensing diaphragm 45. The actuator rod 48 is attached at its other end to a variable area nozzle adjusting lever 52, and is provided with a compression spring 53. The actuator diaphragm 46 is a power responsive means receptive to air pressure entering the chamber 47 through the tube 36. This diaphragm serves as a means for adjusting the lever 52 which operates the power supply regulator for the turbine 10. The compression spring 53 is retained between a compression spring retaining plate 54 and an actuator rod supporting member 55, so that the actuator rod 48 will be urged in a direction tending to close the variable area nozzle 18 for adjusting the power supply to the turbine 10.

As is shown in Fig. 2, the variable area turbine nozzle 18 consists of a nozzle ring 56, an inner plate 57 and a plurality of nozzle vanes 58, which are positioned between the nozzle ring 56 and the inner plate 57. The end of each of the vanes 58 nearest the axis of the turbine wheel or hub of the variable area nozzle is pivotally connected to the inner plate 57, as is shown, for example, at 59; and the opposite or peripheral end of each of the vanes 58 is provided with an adjusting pin 61 extending laterally of the nozzle vanes 58.

The nozzle ring 56 has a plurality of adjusting slots 63 into which the adjusting pins 61 are fitted. The nozzle adjusting lever 52 is connected at the point 64 to the nozzle ring 56 so that when the adjusting rod 48 is moved the nozzle ring 56 will be rotated, the adjusting pins 61 will be caused to move within the adjusting slots 63, and the nozzle vanes 58 will be moved on their pivots so as to open or close the nozzle, depending on the direction in which the actuator rod 48 is moved. In this manner the plane of the nozzle vanes 58 may be varied from a plane which approaches the normal to the nozzle ring when the nozzle vanes are in the opened position, to a plane which is nearly tangential to the nozzle ring when the nozzle vanes are in the closed position.

In operation, rotation of the turbine motor is commenced through the introduction of compressed air through the air inlet 11. The variable area turbine nozzle 18, which is closed by the spring 53 when the turbine is in a state of rest, is opened by the action of the air pressure on the actuator diaphragm 46. The turbine motor will almost immediately reach its governed speed, and when this governed speed is reached, the speed regulating mechanism is in full operation.

The centrifugal governor 24, a speed responsive means, being geared to the turbine output shaft 21, rotates in direct proportion to the speed of the shaft and will, therefore, control the positioning of the valve body 31. More specifically when the shaft 21 speeds up the governor drive shaft 23 also speeds up, and the fly balls 28 tend through the action of centrifugal force to move outward of the axis of the governor drive shaft 23. In so doing they exert an upward force on the movable valve rod 29, causing the valve rod 29 to move upward and carry the valve body 31 off the valve seat 32. When the turbine slows down, the balls 28 tend to move toward the axis of the governor drive shaft 23 and cause the valve body 31 to move into a seating position. The valve 31 acts as a power modifying means when it effects a pressure change in the conductor 36.

Under normal operating conditions without any change in load the position of the vanes 58 of the turbine nozzle 18 is controlled so as to maintain the supply of motive air to the turbine motor constant. The mechanism is thus in a steady state, wherein the air pressure within the pneumatic control system is maintained at a constant pressure due to the action of the centrifugal governor 24 which positions the valve body 31 so as to control the escape of air from the system. The restricted orifice 65 in the air conduit 35 allows a more sensitive pressure control to be maintained within the pneumatic system without an unnecessarily large movement of the valve body 31.

Now assume that the turbine changes speed suddenly due to a change in load, and assume further that the load change is negative and that the turbine therefore begins to speed up. The governor 24, a speed responsive means, being directly geared to the turbine shaft 21, speeds up correspondingly, and the resultant centrifugal action causes the valve rod 29 to start to raise the valve body 31 off its seat 32 and into an open position. As the valve begins to open, air from within the pneumatic system begins to flow out through the now enlarged opening of the valve and into the exhaust chamber 34 and thence to the atmosphere through the exhaust port 37. This flow of air outward decreases the pressure within the pneumatic system and as a result of the decreased pressure behind the actuator diaphragm 46 the nozzle actuator rod 48 is moved by action of the spring 53 in a direction tending to close off or decrease the admission area of the turbine nozzle 18 and cut down the supply of motive air so as to reduce the speed of the turbine accordingly.

Due to this movement of the actuator rod 48 which is connected at 51 to the sensing diaphragm 45 there is a resultant movement of the latter which causes an increase in pressure within the sensing chamber 43. Since the sensing chamber 43 is interconnected with the reset chamber 38 through the pressure transfer conduit 42, the resultant pressure within the first chamber is immediately transmitted to the second chamber and to the reset diaphragm 39. The increased pressure on the reset diaphragm 39 is further transmitted downward through the interconnecting valve rod 29 so as to close down the valve and thereby momentarily arrest any very rapid initial opening response of the valve. The pressure within the pneumatic reset system is now gradually relieved through the orifice leak 44, and the system is thereby allowed to return gradually to its original controlling condition after stability is attained.

Now, although from the drawing and the above description the particular embodiment of the invention which we have so shown and described may be characterized as being a pneumatically driven device, the speed of which is pneumatically controlled and the controls for which are pneumatically reset and damped, the invention is much broader than this. In its broadest aspects it is applicable where it is desired to maintain the speed of a prime mover constant.

According to the method of control and likewise with respect to the type of control which is exercised on the prime mover in order to control its speed the same versatility applies. The control mechanism therefore may be of any type such as mechanical, hydraulic, pneumatic, electrical, et al., or a combination of these with one another. It is obvious however, that it is most useful where the control must be made sensitive and rapidly responsive and therefore would otherwise be somewhat unstable, but it is not limited to this situation.

Furthermore, with respect to the reset and damping system although it is preferable and somewhat more efficient to use a pneumatic arrangement such as has been disclosed, this is likewise not the only suitable means for performing this function. It is quite acceptable to use hydraulic or other resetting means, and in this case it is not necessary to change the mechanism greatly beyond that used for the pneumatic control disclosed. Thus, as long as the reset mechanism employed is effective to arrest the initial response of the control mechanism, so as to decrease the amplitude of its initial response, and is thereafter effective to under-damp the oscillation of the control, it will be satisfactory.

Therefore, while there is shown and described in this application only one form which the invention may assume in practice, and a certain method, it will be understood that this form and method is shown for purposes of illustration and that the invention may be modified and embodied in various other forms without departing from its spirit.

We claim:
1. Speed controlling mechanism for a pneumatically driven prime mover of the type having a source of motive fluid, inlet control means between such source and the prime mover for controlling the flow of motive fluid to the latter and a governor responsive to the speed of the prime mover, said speed controlling mechanism comprising an actuator rod connected to the inlet control means, a resilient member normally urging said actuator rod toward a position to reduce the speed of the prime mover, a fluid pressure actuator including a chamber having a movable wall directly connected to said actuator rod and operative in response to the application of fluid pressure thereto to adjust the inlet control means in opposition to said resilient member toward a position to increase the speed of the prime mover, a fluid pressure supply conduit connected to the chamber of said fluid pressure actuator for conducting actuating fluid under pressure to said actuator, a pilot valve in said fluid pressure supply conduit, an operator for said pilot valve connected to the governor to open said pilot valve to reduce fluid pressure in the chamber of said fluid pressure actuator upon an increase in the speed of the prime mover, a fluid pressure responsive valve actuator directly connected to and movable in unison with said pilot valve, a sensing chamber having a movable wall thereof connected to be moved by said actuator rod, a fluid pressure transfer conduit interconnecting said fluid pressure responsive valve actuator and said sensing chamber whereby movements of the movable wall of said sensing chamber as effected by said actuator rod will effect operation of said valve actuator to move said pilot valve, and means for bleeding fluid from said sensing chamber for controlled dissipation of the fluid pressure applied to said valve actuator.

2. Speed controlling mechanism for a pneumatically driven prime mover of the type having a source of motive fluid, inlet control means between such source and the prime mover for controlling the flow of motive fluid to the latter and a governor responsive to the speed of the prime mover, said speed controlling mechanism comprising an actuator rod connected to the inlet control means, a resilient member normally urging said rod toward a position to reduce the speed of the prime mover, wall means forming an actuator chamber and having an actuator diaphragm and a sensing diaphragm disposed with one side of each subjected to the pressure within said actuator chamber, said actuator diaphragm having a larger surface area exposed to the pressure within said actuator chamber than the surface area of said sensing diaphragm exposed to such pressure, both of said diaphragms being connected for movement with said actuator rod, a fluid pressure supply conduit connected to said actuator chamber for conducing an actuating fluid under pressure to said chamber, a pilot valve in said fluid pressure supply conduit, an operator for said valve connected to the governor to open said pilot valve to reduce fluid pressure in said actuator chamber upon an increase in the speed of the prime mover, a fluid pressure responsive valve actuator directly connected to and movable in unison with said pilot valve, wall means forming a sensing chamber enclosing the other side of said sensing diaphragm, a fluid pressure transfer conduit interconnecting said fluid pressure responsive valve actuator and said sensing chamber whereby movements of said sensing diaphragm as effected by said actuator rod will effect operation of said valve actuator to move said pilot valve, and means for bleeding fluid from said chamber for controlled dissipation of the fluid pressure applied to said valve actuator.

References Cited in the file of this patent
UNITED STATES PATENTS

| | | |
|---|---|---|
| 1,106,434 | Woodward | Aug. 11, 1914 |
| 2,020,847 | Mitereff | Nov. 12, 1935 |
| 2,077,384 | Dittenborn | Apr. 20, 1937 |
| 2,149,390 | Donaldson | Mar. 7, 1939 |
| 2,219,229 | Kalin | Oct. 22, 1940 |
| 2,227,427 | Ehrhart | Jan. 7, 1941 |
| 2,303,752 | Meredith | Dec. 1, 1942 |
| 2,376,212 | Warren | May 15, 1945 |
| 2,514,930 | Branham | July 11, 1950 |

FOREIGN PATENTS

| | | |
|---|---|---|
| 160,847 | Switzerland | June 16, 1933 |